(12) United States Patent
Staykov et al.

(10) Patent No.: US 10,146,674 B2
(45) Date of Patent: Dec. 4, 2018

(54) PLUGIN-BASED SOFTWARE VERIFICATION SYSTEM

(71) Applicant: VMware, INC., Palo Alto, CA (US)

(72) Inventors: Georgi Staykov, Sofia (BG); Todor Todorov, Sofia (BG); Mariya Miteva, Sofia (BG)

(73) Assignee: VMware, Inc., Palo Alto, CA (US)

( * ) Notice: Subject to any disclaimer, the term of this patent is extended or adjusted under 35 U.S.C. 154(b) by 198 days.

(21) Appl. No.: 15/183,807

(22) Filed: Jun. 16, 2016

(65) Prior Publication Data

US 2017/0364436 A1  Dec. 21, 2017

(51) Int. Cl.
*G06F 9/44* (2018.01)
*G06F 11/36* (2006.01)

(52) U.S. Cl.
CPC ...... *G06F 11/3688* (2013.01); *G06F 11/3664* (2013.01)

(58) Field of Classification Search
None
See application file for complete search history.

(56) References Cited

U.S. PATENT DOCUMENTS

2016/0140033 A1\* 5/2016 Alexeevich ......... G06F 11/3688
717/125

\* cited by examiner

*Primary Examiner* — Qamrun Nahar
(74) *Attorney, Agent, or Firm* — Thomas | Horstemeyer, LLP

(57) ABSTRACT

System and methods for providing plugin-based software verification are described. A method may include, upon receiving a first registration instruction containing a first harness plugin associated with a first automated software test, configuring, by a test harness lifecycle controller, a first test harness based on the first harness plugin to support the executing of the first automated software test, wherein the first automated software test is a software test executable by a computer without human intervention. The method may include, upon receiving a first execution instruction, executing, by a test execution engine instructed by the test harness lifecycle controller, the first software test in the first test harness. The method may further include, upon receiving a request for test results, transmitting, by the test harness lifecycle controller in response to the request, test results collected during the executing of the first automated software test.

17 Claims, 4 Drawing Sheets

PLUGIN-BASED SOFTWARE VERIFICATION SYSTEM

BACKGROUND

During the development of a software application, a single testing framework is often used for the Continuous Integration (CI) cycles and release quality control. Although one testing framework may be sufficient for fulfilling the quality requirements of a single software application, multiple test frameworks have to be employed when the single software application is bundled with other applications to form an application suite. In this case, the verification of the application suite may span over multiple software applications each of which requires its own testing framework. Conventional software verification approach may define a new "super" testing framework for the application suite, which makes reusing existing software tests designed for individual software applications very difficult. Further, the different configuration requirements and test result reporting capabilities associated with the existing software tests and testing frameworks further complicate the reusing of these software tests and testing frameworks.

SUMMARY

System and methods for providing plugin-based software verification are described. A method may include, upon receiving a first registration instruction containing a first harness plugin associated with a first automated software test, configuring, by a test harness lifecycle controller, a first test harness based on the first harness plugin to support the executing of the first automated software test, wherein the first automated software test is a software test executable by a computer without human intervention. The method may include, upon receiving a first execution instruction, executing, by a test execution engine instructed by the test harness lifecycle controller, the first software test in the first test harness. The method may further include, upon receiving a request for test results, transmitting, by the test harness lifecycle controller in response to the request, test results collected during the executing of the first automated software test.

DETAILED DESCRIPTION

Figure 1:
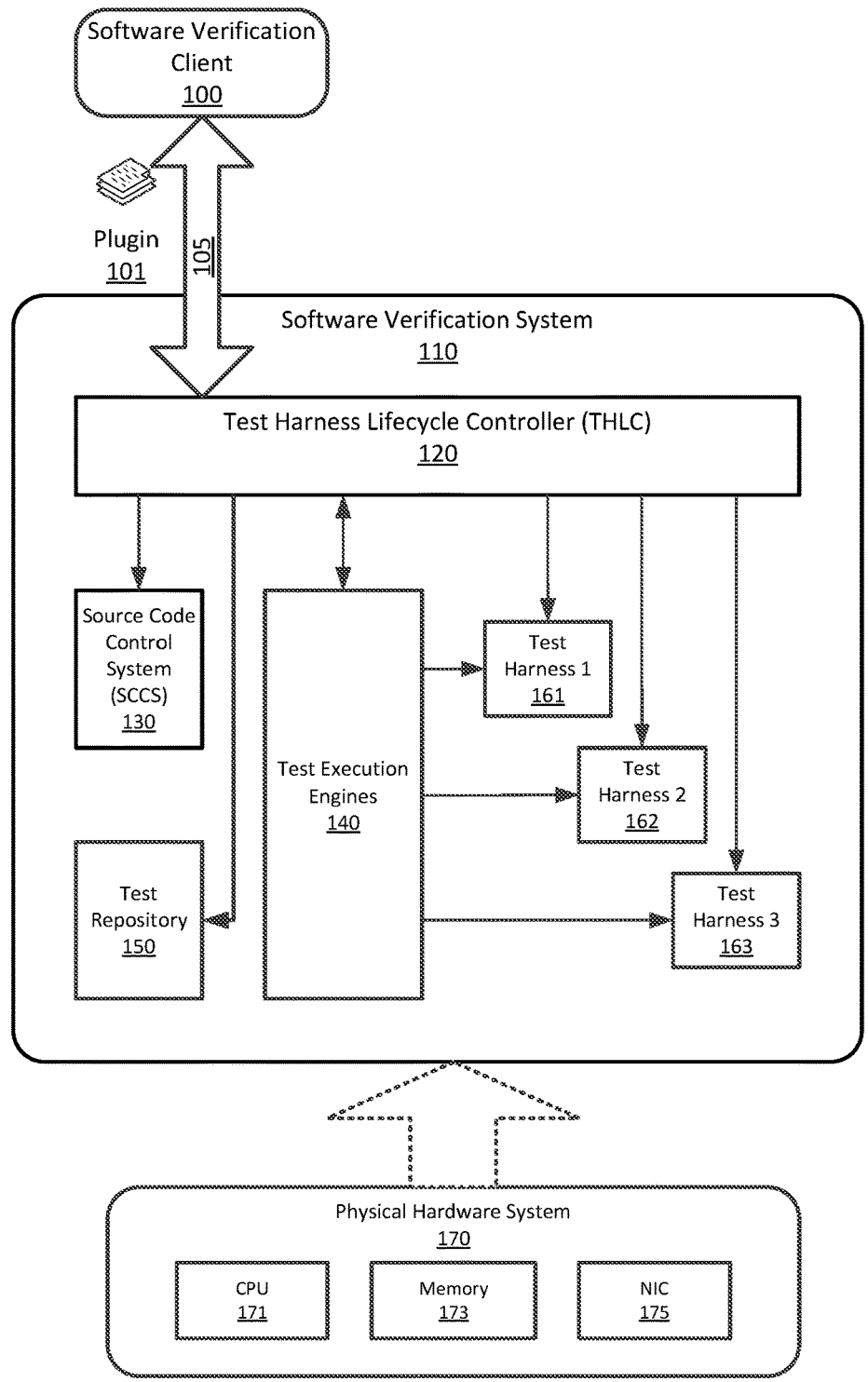
FIG. 1 illustrates a block diagram of a software verification system that provides plugin-based software verification, according to one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

The present disclosure provides system and methods for a generic software verification system which employs plugin-based testing frameworks. The software verification system may allow the dynamic adding and removing of different testing frameworks based on plugin configurations, thereby greatly increasing the reusability of the testing frameworks during software validation and deployment. Specifically, the software verification system may dynamically configure and un-configure test frameworks, initiate test executions in these test frameworks, and collect/aggregate test results afterward.

FIG. 1 illustrates a block diagram of a software verification system that provides plugin-based software verification, according to one or more embodiments of the present disclosure. In FIG. 1, a software verification client 100 may interact with a software verification system 110 to perform plugin-based automated software testing and software verification. The software verification client 100 may be a software or hardware module communicating with the software verification system 110 using one or more instructions 105. Specifically, the software verification system 110 may provide multiple interfaces for receiving the instructions 105, and the software verification client 100 may generate and transmit such instructions 105 to the software verification system 110 based on a user's commands. In some embodiments, the software verification client 100 may have a command-line user interface or web-based user interface allowing a user to create and transmit the instructions 105 using Hypertext Transfer Protocol (HTTP). The software verification client 100 may also be a software application installed on a remote networked computer and interacting with the software verification system 110 via Transmission Control Protocol/Internet Protocol (TCP/IP) communications.

In some embodiments, the software verification system 110, which may be constructed based on a physical hardware system 170, may include, without limitation, a test harness lifecycle controller (THLC) 120, a Source Code Control System (SCCS) 130, one or more test execution engines 140, and a test repository 150. It should be recognized that the various terms, layers and categorizations used to describe the components in FIG. 1 may be referred to differently without departing from their functionalities or the spirit and scope of the present disclosure. For example, the THLC 120 and the test execution engine 140 may be located in the same physical hardware system 170, while the SCCS 130 or the test repository 150 may be deployed on another physical hardware system 170.

In some embodiments, the physical hardware system 170 may be configured with, without limitation, a Central Processing Unit (CPU) 171, memory 173, a Network Interface Card (NIC) 175, and/or additional electronic circuit components not shown in FIG. 1. The CPU 171 may be a general-purpose or specialized computing processor having electronic circuitry to perform arithmetical, logical, and input/output operations for the physical hardware system 170. The CPU 171 may be configured to accelerate the processing of the SCCS 130 and the test repository 150. The CPU 171 may be configured to support functions of the THLC 120 and/or the test execution engine 140. The CPU 171 may also be configured to utilize the physical memory 173 to store or retrieve test cases and test results. The memory 173 may be hardware storage devices having integrated circuits for storing information used in the software verification system 110. The memory 173 may be volatile memory (e.g., dynamic random-access memory (DRAM) or CPU cache memory) and non-volatile memory (e.g., hard drive or flash memory). In some embodiments, the memory 173 may be non-transitory computer-readable storage medium, containing a set of instructions which, when executed by the CPU 171, cause the CPU 171 to perform a method of plugin-based software verification. The NIC 175 may be network communication hardware for transmitting messages among the various components (e.g., the THLC 120 and the test execution engine 140) within, or delivering messages in and out of, the software verification system 110.

In some embodiments, the THLC 120 may be configured to manage and schedule the overall automated testing and verification of a large-scale software application based on the instructions 105 received from the software verification client 100. During software development, the source code of the software application may undergo a large number of "revisions" (or "changes") for debugging and enhancements purposes. The SCCS 130 may be a source code revision system to track and control these revisions of the software application. Each "reversion" of the software application may be deemed a specific version of the source code of the software application, and can be preserved in the SCCS 130 for future reference. A later revision may have one or more updates (e.g., adding, altering, or deleting) applied to an earlier revision of the software application. The SCCS 130 may also store build tools (e.g., makefiles, etc) for building an executable form of the software application.

In some embodiments, the test repository 150 may be a database configured to store/retrieve test suites and test cases for testing and verifying the software application. A "test case" may be a set of commands/procedures that can be automatically executed against a specific revision of the software application. A "test suite" may include multiple test cases for testing different aspects of the same revision of the software application. For example, a test suite may include a first test case configured to test the software application's network communication functions, and a second test case configured to verify the graphic user interface of the software application. Further, each test case may include a set of predicted results/outcomes, which can be compared with the actual results/outcomes generated by executing these commands/procedures during runtime. When performing an automated software test, the test case may generate a "test result" or "test report", indicating whether the tested software application meets the predicted results/outcomes ("passed"), or there are functional errors or non-functional regressions ("failed") in the software application. Likewise, a test suite may generate a test report showing the number of test cases contained therein passed, failed, and/or skipped during automated software test.

In some embodiments, the THLC 120 may instruct the test execution engine 140 to execute a specific test case against a specific revision of the software application. To perform such execution, the THLC 120 may first configure the test execution engine 140 and a test harness for the execution of the specific test case. A "test harness", or "test framework", may refer to a collection of hardware and software setups, all of which may be necessary for the execution of the specific test case against the specific revision of the software application. For convenience purposes, a test harness and/or a test execution engine 140 may be collectively referred to as an "automated testing setup"; and the executing of a specific test case against a specific revision of the software application in a designated test harness may be collectively referred to as an "automated software test."

In some embodiments, the THLC 120 may configure an automated testing setup based on a harness plugin 101 received via the instructions 105 from the software verification client 100. Specifically, a "harness plugin" may include a set of parameters and/or flags for the configuring of an automated testing setup in order to conduct an automated software test. Specifically, the THLC 120 may use the harness plugin 101 to customize and configure an otherwise generic test harness into one that is tailored to the specific test case and/or the specific revision of software application. The HTLC 120 may also use the harness plugin 101 to customize and configure an otherwise generic test execution engine 140 for the executing of the automated software test. Examples of harness plugin parameters may include: IP addresses and credentials associated with the test execution engine 140, network configurations, database configurations, data models (e.g., data structures, class definitions), interface definitions, executable scripts, input data, software-specific services such as datacenter and cluster name, etc.

In some embodiments, the THLC 120 may receive a harness plugin 101 associated with a specific automated software test via an instruction 105, and configure a new test harness (e.g., test harness 161) and/or a test execution engine 140 based on the harness plugin 121. Once finished customizing/configuring the test harness 161, the THLC 120 may load into the test harness 161 the specific revision of the software application retrieved from the SCCS 130, and load into the test harness 161 the specific test case obtained from the test repository 150. Afterward, the THLC 120 may instruct the test execution engine 140 to perform the automated software test in the test harness 161. In some embodiments, the THLC 120 may receive multiple harness plugins 101 to configure multiple test harnesses (e.g., test harnesses 161, 162, 163). After configurations, the THLC 120 may instruct the test execution engine 140 to concurrently execute the automated software tests in these test harnesses. Upon completion of these test executions, the THLC 120 may utilize the test execution engine 140 to collect test results from these executed automated software tests.

In some embodiments, the software verification system 110 may be implemented in a distributed software deployment and configuration environment. Specifically, the THLC 120 may be deployed in a virtualized server (e.g., VMWARE® vCenter), while the test execution engine 140 may be hosted on an individual computer system (e.g., a Jenkins® machine) connected to the THLC 120 via a network. Further, multiple test execution engines 140 may be configured on their respective computer systems, and each test execution engine 140, which may utilize a corresponding set of test harnesses, may have no relations with the other test execution engines 140 running on different computer systems. In this case, the THLC 120 may act as a central repository for all the harness plugins associated with various automated software tests to be executed by these test execution engines 140, and may manage and control the executing of these otherwise unrelated automated software tests on these different computer systems.

Figure 2:
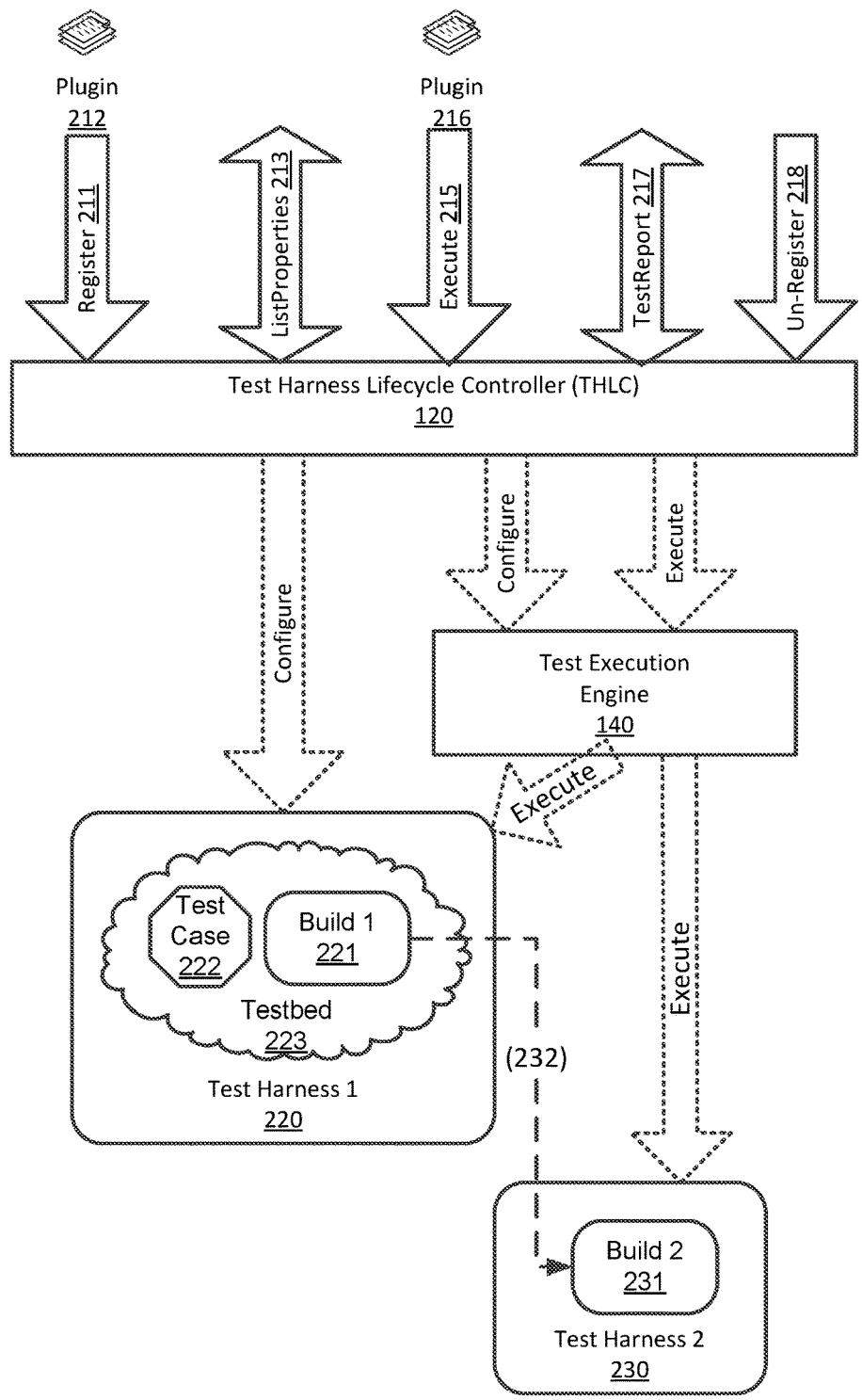
FIG. 2 illustrates details of a test harness lifecycle controller and a test execution engine, according to one or more embodiments of the present disclosure.

FIG. 2 illustrates details of a test harness lifecycle controller and a test execution engine, according to one or more embodiments of the present disclosure. The THLC 120 and the test execution engine 140 of FIG. 2 correspond to their respective counterparts in FIG. 1. In FIG. 2, the THLC 120 may act as a central orchestrating engine capable of configuring and managing test harnesses (e.g., test harnesses 220 and 230). THLC 120 may instruct the test execution engine 140 to execute automated software tests in these test harnesses, and collecting test results during the executing of these automated software tests. The THLC 120 may provide to a software verification client (similar to the software verification client 100 of FIG. 1, not shown in FIG. 2) multiple interfaces which hide the complexity of the test harness lifecycle managements. The THLC 120 may then utilize these interfaces to receive from the software verification client instructions and harness plugins associated with the execution of the automated software tests, and the collection/aggregation of test results generated during the execution of the automated software tests.

In some embodiments, the THLC 120 may provide a "Register" interface 211 for configuring test harnesses and test execution engines 140. Specifically, "registering" or "registration" may refer to a process to create and configure an otherwise generic test harness and/or test execution engines 140 for a specific automated software test. Thus, the software verification client may instruct the THLC 120 to configure a new test harness 220 by invoking the Register interface 211 and transmitting via the Register interface 211 a harness plugin 212. Based on the received harness plugin 212, the THLC 120 may configure and customize the otherwise generic test harness 220 for building the specific revision of the software application and executing the specific test case. The THLC 120 may also configure the test harness 220 to simulate user interactions or provide external services required by the software application.

In some embodiments, to support the execution of an automated software test, the configuration of the test harness 220 may include the configuration of a testbed 223, which may then be used to create a build 221 based on a specific revision of the software application, and used to load a specific test case 222 associated with the automated software test. The test harness 220 may also be required to include various configurations and setups to facilitate the execution of the specific test case 222 against the build 221 in the testbed 223. In other words, the THLC 120 may configure the test harness 220 by constructing the testbed 223, creating the build 221, and loading the test case 222, all based on the harness plugin 212 provided to the THLC 120 via the Register interface 211.

In some embodiments, the THLC 120 may configure the testbed 223 based on test-bed-related parameters in the harness plugin 212. A "testbed" (or "sandbox") may be an independent or isolated platform/environment for executing and repeating an automated software test. For example, a testbed may be an independent computer (or a sub-directory under a computer) having necessary hardware/software configurations for the building, executing, and testing of the software application. Example of the test-bed-related parameters may include the IP address of the computer, the directory of the testbed, and these necessary software configurations.

In some embodiments, the THLC 120 may create a build 221 of the software application in the testbed 223 based on build-related parameters in the harness plugin 212. Specifically, the THLC 120 may retrieve from a SCCS (similar to the SCCS 130 of FIG. 1) and load into the testbed 220 a particular revision of the software application (as well as its related build tools). Afterward, the THLC 120 may perform a building of the particular revision of the software application in the testbed 220. "Building" refers to a process to generate an executable form of the software application from a revision of source code using build tools. Depending on the nature and form of the source code, the THLC 120 may perform compilation, linking, and/or coordinating operations. The generated executable form of the software application may be referred to as a "build" of the particular revision of the software application. Example of the build-related parameters may include the specific revision of the software application, the IP address and credentials of the SCCS, and the build tools configurations. In some embodiments, the THLC 120 may also load a test case 222 from a test repository (similar to the test repository 150 of FIG. 1) and into the testbed 223 based on test-case-related parameters in the harness plugin 212.

In some embodiments, the test harness 220 may require additional services or functionalities necessary for the executing of the automated software test. For example, to test a cloud-based software application, the THLC 120 may require a test harness 220 to have network accesses to external cloud management and automation servers. In this case, the THLC 120 may further configure the test harness 220 to set up these network accesses based on the harness plugin 212. Alternatively, for some of the required services or functionalities that are not available to the test harness 220, the THLC 120 may simulate these services or functionalities by creating substitute services or stubs in the test harness 220.

In some embodiments, the test execution engine 140 may be implemented using an instance of Jenkins® machine. In this case, the THLC 120 may configure the test execution engine 140 based on the test-execution-engine-related parameters in the harness plugin 212. Specifically, the THLC 120 may create and configure a "Jenkins instance" as the test execution engine 140. The THLC 120 may further instantiate a parameterized "Jenkins job" as a test harness 220. Note that the Jenkins job acting as the test harness 220 does not need to reside as a process within the Jenkins instance acting as the test execution engine 140, and can be located on a separate computer system connected to the Jenkins instance via a network. Further, the THLC 120 may extract the various parameters contained in the harness plugin 212, and use these parameters as "Jenkins job parameters." The type of the parameters extracted from the harness plugin 212 should correspond to the expected values for the Jenkins job parameters.

In some embodiments, after the above registration process is completed, the test harness 220 may be deemed ready for executing the automated software tests. The test execution engine 140 may then await further instruction from the THLC 120 for such execution. In addition, the THLC 120 may register additional test harnesses (e.g., test harness 230). Thus, the THLC 120 may have total control in initiating the executing of the automated software test. The THLC 120 may also include or exclude certain test cases from a test suite by adjusting the parameters in the received harness plugin 212 during test harness registration. The THLC 120 may also be instructed by the parameters in the harness plugins 212 to control the uptime of the test harness, thereby ensuring the scalability of the software verification system 110.

In some embodiments, the THLC 120 may provide a "ListProperties" interface 213 for collecting configurable parameters from the test execution engine 140 and the test harnesses 220 and 230. In other words, the software verification client may instruct the THLC 120 to provide these proprietary parameters by invoking the ListProperties interface 213 of the THLC 120. Upon receiving such instruction, the THLC 120 may return a set of parameters with names, descriptive information, and values to the software verification client. The software verification client may then use these returned parameters to determine the statuses of the THLC 120, the test execution engine 140, the test harness 220, and the executing automated software tests. Thus, the THLC 120 may require runtime access to all the parameters needed and used by the registered test harnesses 220. Further, the THLC 120 may also return a proprietary set of properties specific for the THLC 120, which may be included as parameters and values in the harness plugins 212 and 216.

In some embodiments, the THLC 120 may provide an "Execute" interface 215 for executing the automated software test configured in the test harness 220. In other words, the software verification client may instruct the THLC 120 to initiate the executing of the automated software test by invoking this Execute interface 215. Upon receiving such instruction, the THLC 120 may transmit an execute command to the test execution engine 140, which may execute the test case 222 against the build 221 in the testbed 223. In other embodiments, the THLC 120 may concurrently transmit multiple execute commands to several test execution engines 140, in order to execute multiple automated software tests on different test harnesses in parallel. For example, based on the THLC 120's instruction, a first test execution engine 140 may simultaneously execute a first automated software test in the test harness 220, and the same or a different test execution engine 140 may execute a second automated software test in the test harness 230 in parallel.

In some embodiments, the software verification client may pass an additional harness plugin 216 to the THLC 120 via the Execute interface 215. The additional harness plugin 216 may contain a set of execution-related parameters for configuring the test execution engine 140 before/during the executing of the automated software test. The THLC 120 may forward these execution-related parameters to the test execution engine 140. For example, the execution-related parameters may include concrete values uses as inputs to the software application. The execution-related parameters may also include executable scripts to supplement the test case 222 during its execution. Further, the execution-related parameters may be environment properties that are relied upon by Jenkins jobs. In this case, the THLC 120 may use URL encoding to pass the execution-related parameters to the Jenkins jobs.

In some embodiments, during registration of a test harness, the harness plugin 212 received by the THLC 120 may include a dependency parameter (e.g., called "waitFor"), which may indicate that one automated software test is dependent on other automated software tests. For example, during the registering of the test harness 230, the harness plugin 212 may contain such dependency parameter with a value "Build 1." In this case, the dependency parameter indicates that the automated software test for "Build 2" 231 is dependent (shown by an arrow 232 in FIG. 2) on the outcome of the automated software test for "Build 1" 221. Upon receiving instructions to execute the automated software tests in the test harnesses 220 and 230, rather than simultaneously starting these automated software tests, the test execution engine 140 may await the completion of the test on "Build 1" 221 in the test harness 220 before starting the test on "Build 2" 231 in the test harness 230. Such a dependency capability may allow the reuse of resources and test results from among different test harnesses. In some embodiments, suppose the test harness 220 and the test harness 230 are hosted in different test execution engines 140. The THLC 120 may wait for the completion of the automated software test by one test execution engine 140 for "Build 1" 221 in the test harness 220, before instructing another test execution engine 140 to start the automated software test for "Build 2" 231 in the test harness 230.

In some embodiments, the test engine 140 may monitor and collect the test results/outcomes of the automated software tests executing in the various test harnesses. Specifically, the test execution engine 140 may compare the predicted test results/outcomes associated with the test case 222 with the actual test results generated during the executing of the test case 222 on the build 221. Based on the test result comparison, the test execution engine 140 may detect whether there is any functional errors or non-functional regressions in this revision of software application. Alternatively, the test execution engine 140 may acquire the test results using Jenkins provided API, once the execution of an automated software test is completed in one test harness. The test execution engine 140 may store test results from different test harnesses under their respective test harness IDs. Further, the test execution engine 140 may aggregate the test results and prepare test reports to be delivered to the THLC 120.

In some embodiments, the THLC 120 may provide a "TestReport" interface 217 for receiving the test reports aggregated by the test execution engine 140. In other words, the software verification client may instruct the THLC 120 to transmit test reports previously generated by the test execution engine 140 for all the test harnesses by invoking the TestReport interface 217. The THLC 120 may also utilize Jenkins URL to retrieve additional information associated with the executing of the automated software tests, if the information collected by the test execution engine 140 is not enough. Afterward, the THLC 120 may transmit the test reports to the software verification client in response to the TestReport interface 217 being invoked.

In some embodiments, the THLC 120 may provide a "Un-register" interface 218 for un-registering a previously registered test harness. In other words, the software verification client may instruct the THLC 120 to initiate the un-registering of a test harness by invoking this Execute interface 215. Based on the harness identifier transmitted via the Un-register interface 218, the THLC 120 may stop any execution of automated software test in the corresponding test harness, and remove the build and test case contained therein. After the un-register process, the un-registered test harness is returned to an inactive state, and would not participate in any software testing and validation process. The THLC 120 may subsequently register an un-registered test harness for the testing of a different automated software test.

Figure 3:
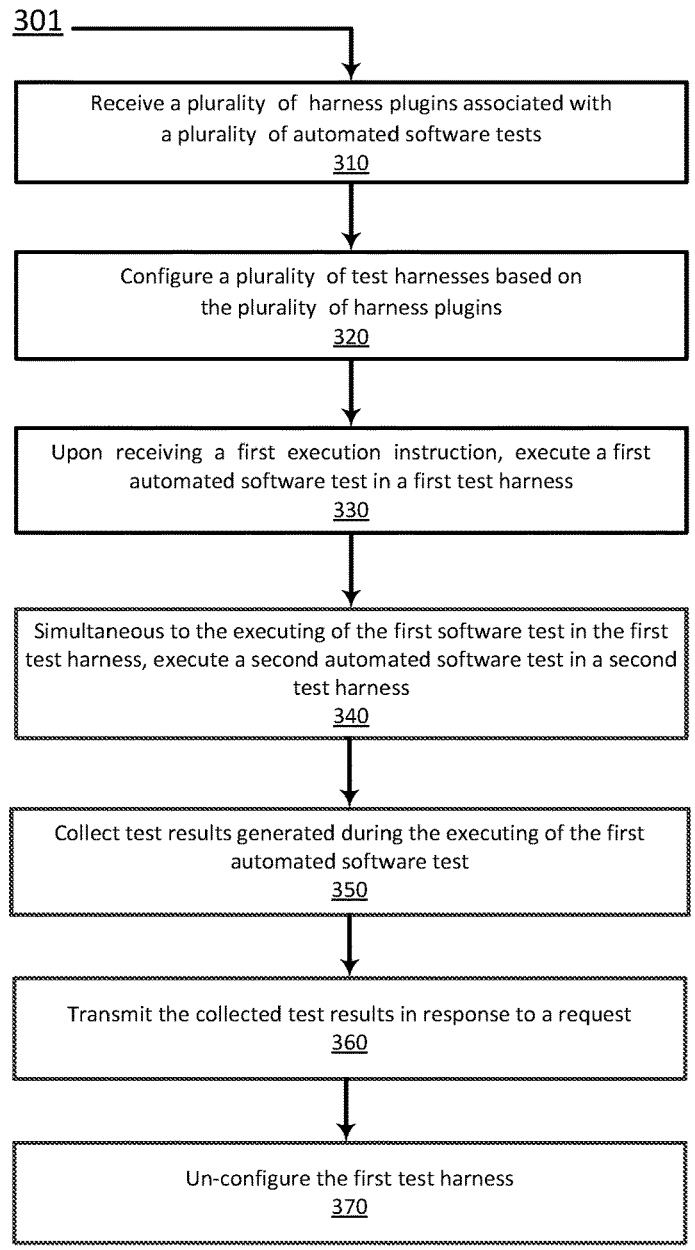
FIG. 3 shows a flow diagram illustrating a process to perform plugin-based software verification, according to one or more embodiments of the present disclosure.

FIG. 3 shows a flow diagram illustrating a process to perform plugin-based software verification, according to one or more embodiments of the present disclosure. The processes 301 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 310, a test harness lifecycle controller (THLC) of a software verification system may receive from a software verification client a plurality of harness plugins associated with a plurality of automated software tests. The THLC may receive the plurality of harness plugins via its Register interface. In some embodiments, the THLC may be configured to support multiple test harnesses. And each of the plurality of automated software tests is a software test executable by the system without human intervention.

At block 320, the THLC may configure a plurality of test harnesses based on the plurality of harness plugins. Each of the plurality of harness plugins contains a plurality of parameters for customizing corresponding one of the plurality of test harnesses. After the configuration, each configured test harness in the plurality of test harnesses supports the execution of a corresponding one of the plurality of automated software tests. In some embodiments, the THLC may customize each test harness by automatically configuring a testbed for the test harness, constructing in the testbed a build associated with an automated software test corresponding to the test harness, and loading a test case associated with the automated software test in the testbed.

At block 330, the THLC may receive from the software verification client via an Execute interface a first execution instruction associated with a first test harness selected from the plurality of test harnesses. Upon receiving this first execution instruction, the THLC may instruct the test execution engine to execute in the first test harness a corresponding first automated software test selected from the plurality of automated software tests. In some embodiments, the THLC may receive an execution harness plugin from the software verification client along with the first execution instruction. The THLC may configure the first software test, the first test harness, and the test execution engine based on the plurality of parameters in the execution harness plugin before the executing of the first automated software test.

At block 340, the THLC may receive from the software verification client via the Execute interface a second execution instruction associated with a second test harness selected from the plurality of test harnesses. Upon receiving the second execution instruction, the THLC may instruct the test execution engine to execute in the second test harness a corresponding second automated software test selected from the plurality of automated software tests, simultaneous to the executing of the first automated software test in the first test harness.

In some embodiments, a first harness plugin is associated with the first automated software test, and a second harness plugin is associated with the second automated software test. The second harness plugin includes a dependency parameter indicating the second automated software test being dependent on the first automated software test. In this case, the test execution engine may await completion of the executing of the first automated software test before starting the executing of the second automated software test in the second test harness.

At block 350, during the executing of the first automated software test and/or the second automated software test, the test execution engine may collect test results associated with the first automated software test and/or the second automated software test. At block 360, the THLC may receive a request from the software verification client for these test results. In this case, the THLC may transmit the collected test results obtained from the test execution engine to the software verification client in response to the request to the THLC.

At block 370, the THLC may receive from the THLC an un-registration instruction. Upon receiving such an instruction, the THLC may un-configure the first test harness. After the un-configuring of the first test harness, the test execution engine cannot execute the first automated software test in the first test harness.

Figure 4:
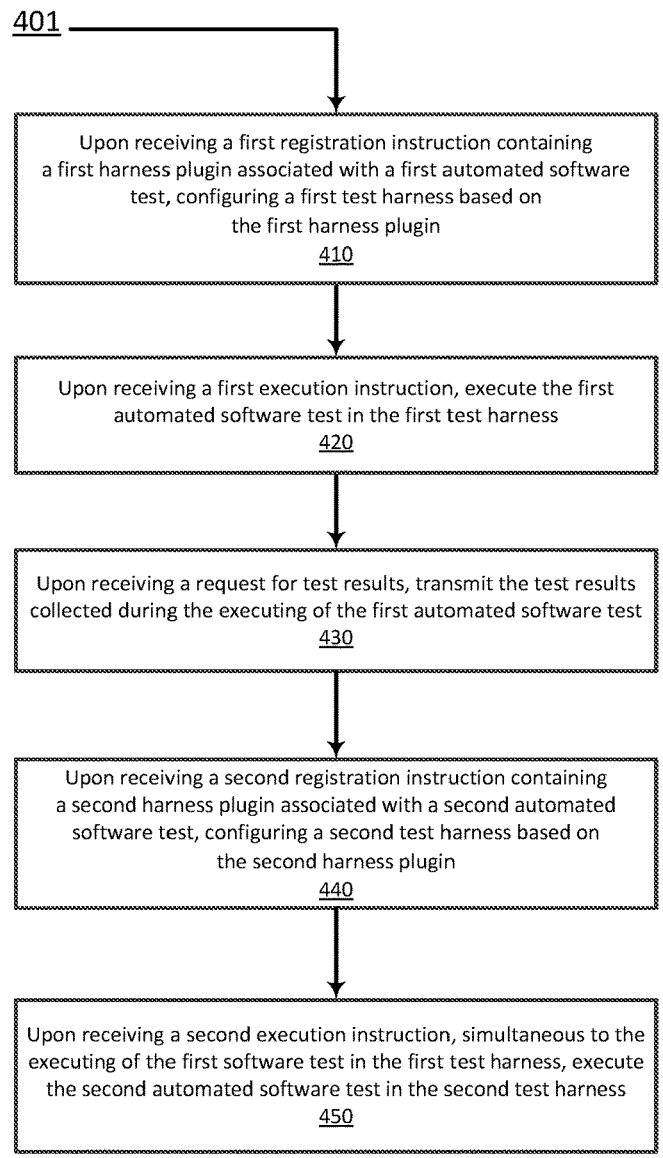
FIG. 4 shows a flow diagram illustrating another process to perform plugin-based software verification, according to one or more embodiments of the present disclosure.

FIG. 4 shows a flow diagram illustrating another process to perform plugin-based software verification, according to one or more embodiments of the present disclosure. The processes 401 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 410, a test harness lifecycle controller (THLC) of a software verification system may receive from a software verification client a first registration instruction containing a first harness plugin associated with a first automated software test. Upon receiving the first registration instruction, the THLC may configure a first test harness based on the first harness plugin to support the executing of the first automated software test. In some embodiments, the first harness plugin contains a plurality of parameters, and the THLC may customize the first test harness by configuring a testbed for the first test harness, constructing a build in the testbed, and loading a test case associated with the first automated software test in the testbed.

At block 420, the THLC may receive from the software verification client via an Execute interface a first execution instruction. Upon receiving the first execution instruction, the THLC may instruct the test execution engine to execute the first automated software test in the first test harness. In some embodiments, the THLC may obtain a plurality of parameters from the first harness plugin. The first execution instruction may be a URL instruction encoded with the plurality of parameters in the first harness plugin. The THLC may configure the first software test, the first test harness, and the test execution engine based on the plurality of parameters before the executing of the first automated software test. The THLC may transmit the first execution instruction to the test execution engine via network communications, and the THLC may monitor the executing of the first software test by accessing the plurality of parameters via the test execution engine.

At block 430, during the executing of the first automated software test, the test execution engine may collect test results associated with the first automated software test. The THLC may receive a request from the software verification client for these test results. In this case, the THLC may transmit the collected test results obtained from the test execution engine to the software verification client in response to the request to the THLC.

At block 440, the THLC may receive from the software verification client a second registration instruction containing a second harness plugin associated with a second automated software test. The THLC may configure a second test harness based on the second harness plugin. After the configuration, the configured second test harness may support the execution of the second automated software test.

At block 450, the THLC may receive a second execution instruction from the software verification client via the Execute interface. Upon receiving the second execution instruction, the THLC may instruct the test execution engine to execute the second automated software test in the second test harness simultaneous to the executing of the first automated software test in the first test harness. In some embodiments, the second harness plugin received at block 440 includes a dependency parameter indicating the second automated software test being dependent on the first automated software test. In this case, the test execution engine may await completion of the executing of the first automated software test before starting the executing of the second automated software test in the second test harness.

Thus, systems and methods for performing plugin-based software verification have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-ft or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system configured for providing plugin-based software verification, the system comprising a processor and memory coupled with the processor, wherein the memory is configured to provide the processor with instructions for:
   receiving, by a test harness lifecycle controller executing in the system, a plurality of harness plugins associated with a plurality of automated software tests, wherein each of the plurality of automated software tests is a software test executable by the system without human intervention;
   configuring, by the test harness lifecycle controller, a plurality of test harnesses based on the plurality of harness plugins, wherein each of the plurality of harness plugins contains a plurality of parameters for customizing a corresponding one of the plurality of test harnesses, and each configured test harness in the plurality of test harnesses supports the execution of a corresponding one of the plurality of automated software tests;
   upon receiving a first execution instruction associated with a first test harness selected from the plurality of test harnesses, executing, by a test execution engine instructed by the test harness lifecycle controller, in the first test harness, a corresponding first automated software test selected from the plurality of automated software tests; and
   upon receiving a second execution instruction associated with a second test harness selected from the plurality of test harnesses, simultaneous to the executing of the corresponding first automated software test in the first test harness, executing, by the test execution engine instructed by the test harness lifecycle controller, in the second test harness, a corresponding second automated software test selected from the plurality of automated software tests.

2. The system of claim 1, wherein a first harness plugin is associated with the first automated software test and a second harness plugin is associated with the second automated software test, the second harness plugin including a dependency parameter indicating the second automated software test being dependent on the first automated software test, and the executing of the second automated software test further comprises:
   awaiting, by the test execution engine, completion of the executing of the first automated software test before starting the executing of the second automated software test in the second test harness.

3. The system of claim 1, wherein the configuring of the plurality of test harnesses comprises:
   for the first test harness selected from the plurality of test harnesses,
      configuring a testbed for the first test harness;
      constructing a build in the testbed; and
      loading a test case associated with the first automated software test in the testbed.

4. The system of claim 1, wherein the executing of the first automated software test further comprises:
   receiving an execution harness plugin; and
   configuring the corresponding first software test and the first test harness based on a plurality of parameters in the execution harness plugin before the executing of the first automated software test.

5. The system of claim 1, wherein the memory is further configured to provide the processor with instructions for:
   collecting, by the test execution engine, test results generated during the executing of the first automated software test; and
   upon receiving a request for test results, transmitting, by the test harness lifecycle controller, the collected test results in response to the request.

6. The system of claim 1, wherein the memory is further configured to provide the processor with instructions for:
   upon receiving an un-registration instruction, un-configuring, by the test harness lifecycle controller, the first test harness, wherein after the un-configuring of the first test harness, the test execution engine cannot execute the first automated software test in the first test harness.

7. A method configured for providing plugin-based software verification, the method comprising:
   upon receiving a first registration instruction containing a first harness plugin associated with a first automated software test, configuring, by a test harness lifecycle controller, a first test harness based on the first harness plugin to support the executing of the first automated software test, wherein the first automated software test is a software test executable by a computer without human intervention;
   upon receiving a first execution instruction, executing, by a test execution engine instructed by the test harness lifecycle controller, the first automated software test in the first test harness;
   upon receiving a request for test results, transmitting, by the test harness lifecycle controller in response to the request, test results collected during the executing of the first automated software test; and
   upon receiving a second registration instruction containing a second harness plugin associated with a second automated software test, configuring, by the test harness lifecycle controller, a second test harness based on the second harness plugin to support the executing of the second automated software test; and
   upon receiving a second execution instruction, simultaneous to the execution of the first software test in the first test harness, executing, by the test execution engine instructed by the test harness lifecycle controller, the second automated software test in the second test harness.

8. The method as recited in claim 7, wherein the second harness plugin includes a dependency parameter indicating the second automated software test being dependent on the first automated software test, and the executing of the second automated software test further comprises:
   awaiting, by the test execution engine, completion of the executing of the first automated software test before starting the executing of the second automated software test in the second test harness.

9. The method as recited in claim 7, wherein the first harness plugin contains a plurality of parameters, and the configuring of the first harness plugin comprising:
   configuring a testbed for the first test harness;
   constructing a build in the testbed; and
   loading a test case associated with the first automated software test in the testbed.

10. The method as recited in claim 7, wherein the first execution instruction includes an execution harness plugin; and the executing of the first automated software test further comprises:

configuring, by the test harness lifecycle controller, the first software test and the first test harness based on a plurality of parameters in the execution harness plugin before the executing of the first automated software test.

11. The method as recited in claim 10, wherein the first execution instruction is a URL instruction encoded with the plurality of parameters in the first harness plugin.

12. The method as recited in claim 10, wherein the first registration instruction and the first execution instruction are transmitted from a client executing external to and communicating with the test harness lifecycle controller via network communications, and the test harness lifecycle controller monitors the executing of the first software test by accessing the plurality of parameters via the test execution engine.

13. The method as recited in claim 7, further comprising:
upon receiving an un-registration instruction, un-configuring, by the test harness lifecycle controller, the first test harness.

14. A non-transitory computer-readable storage medium, containing a set of instructions which, when executed by a processor, cause the processor to perform a method for providing plugin-based software verification, the method comprising:
upon receiving a first registration instruction containing a first harness plugin associated with a first automated software test, configuring, by a test harness lifecycle controller, a first test harness based on the first harness plugin to support the executing of the first automated software test, wherein the first automated software test is a software test executable by the processor without human intervention;
upon receiving a first execution instruction, executing, by a test execution engine instructed by the test harness lifecycle controller, the first software test in the first test harness;
upon receiving a request for test results, transmitting, by the test harness lifecycle controller in response to the request, test results collected during the executing of the first automated software test; and
upon receiving a second registration instruction containing a second harness plugin associated with a second automated software test, configuring, by the test harness lifecycle controller, a second test harness based on the second harness plugin to support the executing of the second software test; and
upon receiving a second execution instruction, simultaneous to the executing of the first software test in the first test harness, executing, by the test execution engine instructed by the test harness lifecycle controller, the second automated software test in the second test harness.

15. The non-transitory computer-readable storage medium of claim 14, wherein the second harness plugin includes a dependency parameter indicating the second automated software test being dependent on the first automated software test, and the executing of the second automated software test further comprises:
awaiting, by the test execution engine, completion of the executing of the first automated software test before starting the executing of the second automated software test in the second test harness.

16. The non-transitory computer-readable storage medium of claim 14, wherein the first harness plugin contains a plurality of parameters, and the configuring of the first harness comprises:
configuring a testbed for the first test harness;
constructing a build in the testbed; and
loading a test case associated with the first automated software test in the testbed.

17. The non-transitory computer-readable storage medium of claim 14, wherein the second execution instruction includes an execution harness plugin; and the executing of the second automated software test further comprises:
configuring, by the test harness lifecycle controller, the first software test and the first test harness based on a plurality of parameters in the execution harness plugin before the executing of the first automated software test.

* * * * *